March 28, 1967 D. H. PEDERSEN 3,311,209
EMBOSSING TOOLS AND MAGAZINE SUPPLIES THEREFOR
Filed Aug. 3, 1965 2 Sheets-Sheet 1
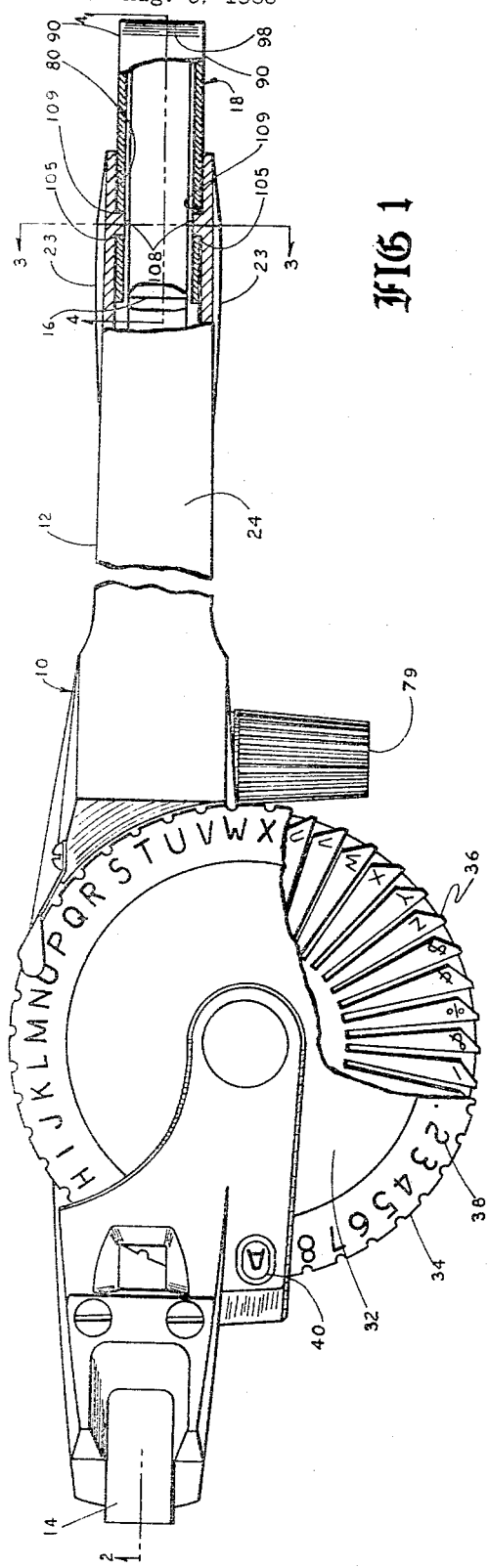
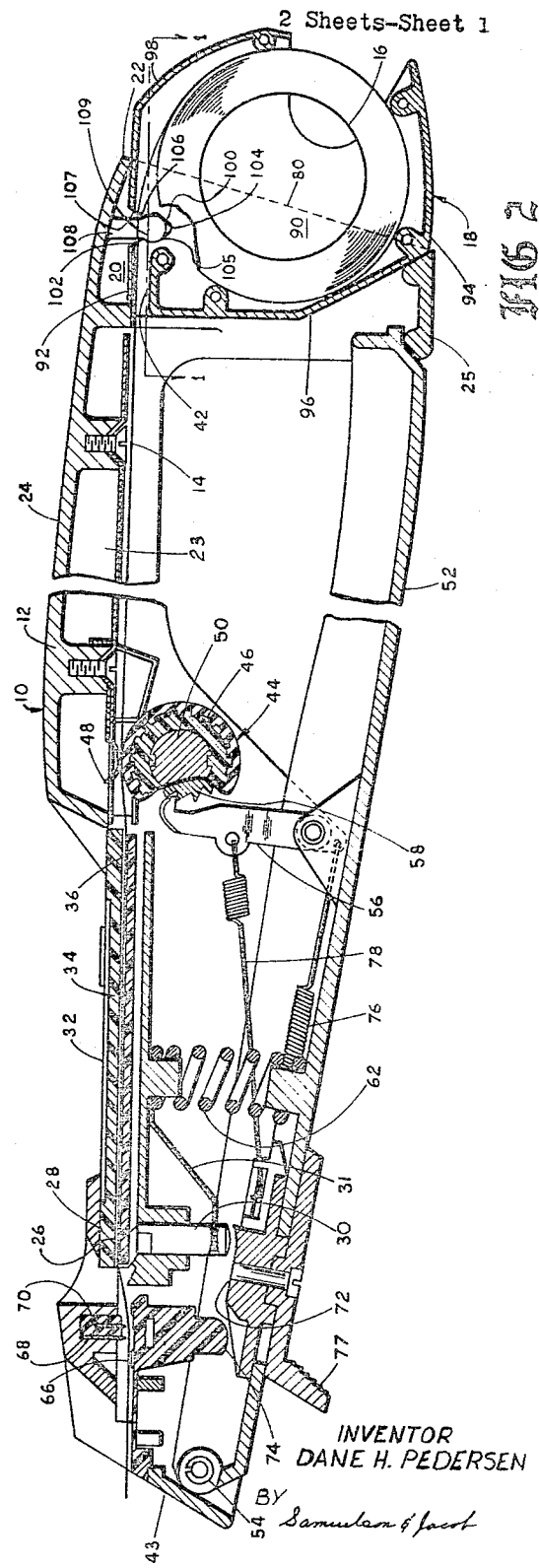
INVENTOR
DANE H. PEDERSEN
BY Samuelson & Jacob March 28, 1967　　　D. H. PEDERSEN　　　3,311,209
EMBOSSING TOOLS AND MAGAZINE SUPPLIES THEREFOR
Filed Aug. 3, 1965　　　　　　　　　　　　　2 Sheets-Sheet 2

INVENTOR
DANE H. PEDERSEN
BY
Samuelson & Jacob

United States Patent Office 3,311,209
Patented Mar. 28, 1967

3,311,209
EMBOSSING TOOLS AND MAGAZINE
SUPPLIES THEREFOR
Dane H. Pedersen, Moraga, Calif., assignor to Dymo
Industries, Inc., Emeryville, Calif., a corporation of
California
Filed Aug. 3, 1965, Ser. No. 476,918
9 Claims. (Cl. 197—6.7)

The invention relates generally to embossing tools for embossing strip material which is supplied to the tool in a magazine and magazine supplies for such tools. More specifically, the invention pertains to means for accurately locating and positively securing such magazines within the tools.

A variety of embossing tools are presently available for establishing embossments in strips of embossable material in the fabrication of labels, signs, plates, tags, and the like. More recently, such tools have been developed for embossing various indicia on thin plastic strips formed of sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. Often, the strip material is supplied from a magazine placed in the body of the tool. The strip material is usually in the form of an elongated flexible tape supplied in a coil.

The smooth, reliable operation of the tool requires that the strip material be readily fed from the supply by the feed means. Thus, the registry and securement of a magazine supply within the body of the tool becomes an important factor in the overall performance of the tool. At the same time, proper registry and securement of a magazine supply should be accomplished without sacrificing the ease of insertion and removal of magazines. Where the magazines are interchangeable to provide for the removal and replacement of a magazine before the strip supply therein is exhausted, as for example in changing from a strip of one color to a strip of another color, the strip material which has been advanced from the supply into the embossing tool should be retracted into the magazine prior to the removal of the magazine from the tool. Hence, it is advantageous to provide some means for securing the magazine in place while the strip is fed back into the supply as well as while the strip is being advanced from the supply into the tool.

It is therefore an object of the invention to provide means in an embossing tool for locating and securing a magazine supply of embossable material within the body of the tool.

Another object of the invention is to provide an embossing tool having means for locating and securing a magazine supply of embossable material within the body of the tool and a magazine having means for cooperatively engaging the locating and securing means when the magazine is in place in the body of the tool.

A further object of the invention is to provide means for locating and securing a magazine supply of embossable material within the body of an embossing tool, the means allowing ready insertion and removal of the magazine to assure ease of interchangeability of magazines along with their respective supplies.

Still another object of the invention is to provide a magazine for a strip supply in an embossing tool, the magazine having means for positively engaging and retaining therein cooperating locating and securing means in the body of the tool.

A still further object of the invention is to provide, as an improvement in embossing tools, means for locating and securing a magazine supply within the body of the tool, the means requiring a minimum departure in the structural arrangement of the tool and magazine combination from that of currently available tools and magazines yet providing the requisite effectiveness.

The invention may be described briefly as an improvement in a magazine and in a tool used in a combination including a tool for embossing strip material wherein a strip of embossable material is advanced along a fixed path through the body of the tool from a strip supply located in the body toward embossing means in the body and is selectively retracted back into the supply and a magazine containing the supply and received within socket means in the body. The improvement lies in means for precluding inadvertent removal of the magazine from the socket means as a result of the advancement and retraction of the strip material and comprises means defining at least one slot in the magazine extending from an open mouth to a root and including means defining a seat intermediate the mouth and the root and means for constricting the width of the slot between the seat and the mouth and means defining at least one protuberance extending into the socket means and including an enlarged portion complementary to the configuration of the seat and having a width greater than the constricting means for being admitted through the mouth into the seat wherein the enlarged portion is lodged and retained by the constricting means to locate and secure the magazine within the socket means.

The invention wil be more fully understood and further objects and advantages thereof will become apparent in the following detailed description of an embodiment of the invention illustrated in the accompanying drawings, in which:

FIGURE 1 is a top plan view, partially sectioned along line 1—1 of FIGURE 2, of an embossing tool and magazine strip supply constructed in accordance with the invention;

FIGURE 2 is a side elevational cross-sectional view of the tool and magazine illustrating the internal construction thereof and cooperation therebetween;

Figure 3:
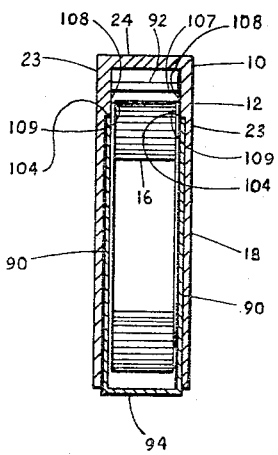
FIGURE 3 is a cross-section taken along line 3—3 of FIGURE 1.

Referring to the drawings, a hand operated embossing tool is indicated generally at 10 in FIGURES 1 and 2. Tool 10 has a body or housing 12 which has a general configuration adapted to make the tool easily operated while being held in one hand. The tool is designed to emboss selected indicia in an elongated strip of embossable material such as the variety of thermoplastic resins currently available in the form of plastic tape. As seen in FIGURES 1 and 2, an embossable tape 14 is supplied in the form of a coil or roll 16 coiled around an axis, the roll being placed within a tape magazine 18 received within a socket 20 located at one end 22 of the body of the tool. Tool 10 has opposite sides 23, a top 24 and a bottom 25.

Embossing of the tape 14 is accomplished at an embossing station 26 wherein there is located embossing means shown in the form of an embossing die set 28 activated by an actuating member 30 mounted for reciprocation in the housing and supported in place beneath the die set by a leaf spring retainer 31. Die set 28 is one of a series of die sets located in the periphery of selector wheel 32 which is rotatably mounted in housing 12 so that any one of the series of die sets can be located at the embossing station 26 to emboss selected indicia in the tape 14. Selector wheel 32 is made up of upper and lower disks 34 and 36, respectively, one of which carries the die and the other of which carries the punch of each die set.

As seen in FIGURE 1, the upper disk 34 is provided with visible characters 38 on the outer face thereof corresponding to the indicia which can be embossed by the selectable die sets. The visible characters are also located along the periphery of the selector wheel, but are circumferentially displaced from their corresponding die sets so that when a particular die set is located at the embossing station 26, the corresponding visible character is located at a selector slot 40 provided in the housing 12.

Tape 14 is fed from supply roll 16 through an aperture 42 in magazine 18 into housing 12 toward an opposite end 43 thereof and toward the embossing station 26 by feed means 44 comprising a feed roll 46 which frictionally grips the tape where a leaf spring 48 presses the tape against the surface of the feed roll and advances the tape in prescribed increments by being rotated in a counterclockwise direction along with shaft 50 upon which roll 46 is mounted, shaft 50 being journaled in the housing, all as will be explained hereinafter.

Embossing of tape 14 is accomplished by displacing actuating handle 52, which is pivotally mounted to housing 12 at 54, in a counterclockwise direction to bring actuating member 30 vertically upwardly into contact with a portion of lower disk 36 and continuing such movement until member 30 actuates the die set 28 positioned at the embossing station 26 and an embossment is established in the tape. At the same time, pawl 56 is moved vertically upwardly to engage the next successive tooth of ratchet wheel 58 which is operatively interengaged with feed roll 46 such that rotation of the ratchet wheel will rotate the feed roll. Rotation of ratchet wheel 58 is precluded during the upward movement of pawl 56 by virtue of spring actuated detent means (not shown) which resiliently engages further teeth of the ratchet wheel. During the counterclockwise displacement of actuating handle 52, helical spring 62 is compressed so that upon completion of the embossing operation and release of actuating handle 52, the handle 52 is urged back to its starting position by spring 62 with a force sufficient to assure that pawl 56 will rotate ratchet wheel 58 in a counterclockwise direction against the deterrent of the aforementioned detent to rotate feed roll 46 and advance tape 14 through the increment necessary to index the tape for a subsequent embossment. The detent further serves to accurately define the desired increment of rotation so that the tape is automatically indexed a length sufficient to accurately locate each successive embossment on the tape.

Upon completion of the particular embossed article, the article may be served from the tape by displacement of an anvil 66 upwardly to bring tape 14 into contact with cutting blades 68 and 70 mounted in the housing. A manually operable slide member 72 may be selectively positioned below reciprocating member 30, as shown in FIGURE 2, or below a depending portion 74 of anvil 66. Slide member 72 is normally maintained below reciprocating member 30 by means of spring 76 so that actuation of handle 52 will normally produce an embossment; however, similar actuation of handle 52 may be made to sever the tape by the sliding of member 72 to the left, by means of a force exerted in that direction upon lever 77, to the position below anvil portion 74, in which position member 30 will not be actuated but anvil 66 will be driven upwardly. Blade 70 will then sever the tape while blade 68 will establish a tab at the severed end of the completed embossed article for facilitating the subsequent removal of a backing strip which is generally present as a part of the embossable strip material. Spring 78 will draw pawl 56 out of engagement with ratchet wheel 58 during the severing operaiton so that the tape will not be advanced at the completion of the operation. A tape advance knob 79 is operatively connected to shaft 50 for manually advancing the tape 14 by rotation thereof whenever it is desired to advance tape 14 without actuating the handle 52. Knob 79 can also be rotated in an opposite (clockwise) direction to feed tape 14 from the embossing station back toward the magazine supply and thus retract tape 14 by sliding member 72 to the left, as before, and thereby releasing pawl 56 from engagement with ratchet wheel 58 to free shaft 50 for such rotation. Such retraction of tape 14 would be necessary where it is desired to remove the magazine 18 from the tool before exhausting tape supply roll 16.

Magazine 18 is received within the body of the tool 10 through an opening 80 adjacent the rear end 22 of the housing 12 and is seated within the socket 20 as shown. Magazine 18 has a pair of opposed side walls 90 interconnected by a top wall 92, bottom wall 94, front wall 96 and rear wall 98. The coiled tape supply is placed in the magazine 18 with the axis of the coil extending generally perpendicular to side walls 90 and an aperture 42 in the front wall allows tape 14 to pass therethrough on the way to the embossing station. A slot 100 is provided in each side wall, each slot having a profile lying in the plane of a side wall 90 which is perpendicular to the plane of the tape traveling through the tool and including a mouth 102 at the top of the magazine and culminating at a root 104 defined by a cut-out area of the slot. Each slot has a seat 105 intermediate the mouth and the root thereof such that the cut-out area is at the portion of the seat furthest from the mouth and the profile of the slot is tapered from the mouth toward the seat to establish a constriction 106 in the width of the slot between the mouth and the seat for purposes which will be explained below. The slots 100 are interconnected at their mouths across the top of the magazine by a transverse opening 107 in the top of the magazine.

In order to accurately locate and positively secure the magazine in proper position within the socket and thus facilitate the operation of tool 10 by assuring ease of travel of the tape as it is advanced from the supply through the tool and retracted from the tool back into the magazine, protuberances 108 project from opposed inner walls of the socket 20, as best seen in FIGURES 1 and 3, the protuberances extending in a direction generally perpendicular to the planes in which side walls 90 of the magazine and the profile of slots 100 lie. Each protuberance 108 is integral with a side wall of the housing and has an enlarged portion 109 having a form corresponding generally to the configuration of seat 105 of each slot 100.

As best seen in FIGURES 2 and 3, magazine 18 is held positively and firmly by the lodging of portion 109 of each protuberance 108 within seat 105 of each slot 100. Because enlarged portion 109 has a width greater than that of the constriction 106, the constriction in each slot will retain a portion 109 seated within seat 105 so that the magazine cannot be inadvertently dislodged and removed from the socket by forces tending to move the magazine through bottom opening 80. In addition, slots 100 run vertically from mouth to root and the cooperation of the protuberances with the slots positively precludes movement of the magazine forward or backward during advancement or retraction of the tape and inadvertent removal of the magazine from the socket as a result of the forces encountered when tape 14 is retracted into magazine 18. Thus, the magazine is secured in place in the socket; however, the magazine is readily inserted or removed as will now be explained.

Figure 4:
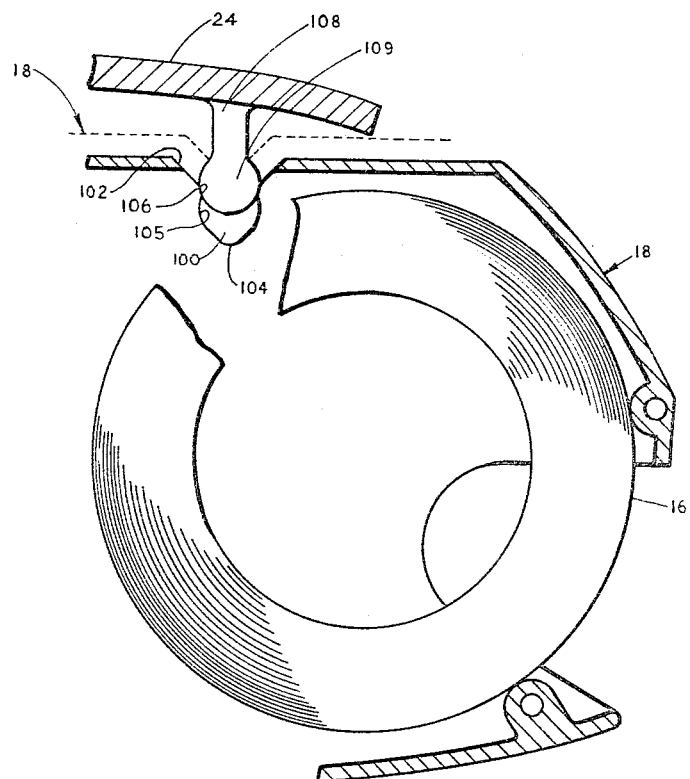
FIGURE 4 is an enlarged fragmentary side elevational view illustrating the placement of the magazine in the body of the tool.

Turning now to FIGURE 4, magazine 18 is shown in an intermediate position during either insertion or removal from the socket 20, the inserted position being indicated in phantom. In placing the magazine within the socket, the enlarged portion 109 of a protuberance is first located within the mouth of each slot and is then passed through the constriction in the slot to the seat. As seen in FIGURE 4, the constriction 106 will dilate or expand to allow passage of the enlarged portion 109 therethrough so that the enlarged portion may be admitted to the seat 105. The dilation of constriction 106 is in the direction generally perpendicular to the axis of the coiled tape supply and is facilitated by the opening 107 and by the length of the slot 100, which length is made to extend beyond the seat 105 to the root 104 by virtue of the cut-out area which spaces the constriction from the root, both of which measures allow widening of the constriction to permit passage of the enlarged portion therethrough. The resiliency of the material of the magazine will return the constriction to its normally narrower width so that the constriction will retain the enlarged portion of the protuberance in seat 105. The insertion procedure assures that the magazine will be properly located as described above while attaining such insertion without placing any significant inwardly directed forces upon the side walls 90 of the magazine, which forces may tend to bend the walls 90 inwardly, parallel to the axis of roll 16, and against the roll 16 with consequent damage to the tape or a hampering of the free passage of the tape from the magazine. Additionally, such inwardly directed forces could cause permanent injury to the magazine itself. Furthermore, the protuberances and mating slots achieve the desired locking of the magazine within the socket without establishing outwardly directed forces upon the side walls of the socket so that damage to the housing is precluded as a result of insertion and removal of a magazine. Moreover, the described construction requires no relative lateral movement of the mating parts which could give rise to damaging inwardly or outwardly directed forces upon the magazine and tool body, respectively. Removal of the magazine from the socket is accomplished by merely reversing the above described insertion procedure.

Thus, it will be seen that the invention provides simplified means in embossing tool 10 for locating and securing magazine 18 within the tool without requiring an extensive departure from known constructions in order to accomplish a high degree of effectiveness.

It is understood that the above detailed description of an embodiment of the invention is provided by way of example only. Various details of design and construction may be modified without departing from the true spirit and scope of the invention as defined in the appended claims.

What is claimed is:

1. In a combination including
  a tool for embossing strip material wherein a strip of embossable material is advanced through the body of the tool from a coiled strip supply located in the body along a fixed path generally perpendicular to the axis of the coiled strip supply toward embossing means in the body and is selectively retracted back into the supply; and
  a magazine containing said supply and received within socket means in the body;
  means for precluding inadvertent removal of the magazine from the socket means as a result of the advancement and retraction of the strip material, said means comprising
  means defining at least one slot in the magazine extending from an open mouth past a constricting means and then past an enlarged seat and finally to a root defined by a cut-out area at the portion of said enlarged seat which is furthest from said mouth, said constricting means being resiliently dilatable in a direction generally perpendicular to the axis of the coiled strip supply by virtue of the cut-out area forming the root and the spacing of the constricting means from the root; and
  means defining at least one protuberance extending into the socket means from the body to an extremity and extending into the slot and including an enlarged portion complementary to the configuration of said seat and having a width greater than said constricting means for being admitted through said mouth and said constricting means into said seat by dilation of said constricting means in said direction generally perpendicular to the axis of the coiled strip supply, said enlarged portion of said protuberance contacting said seat along the perimeter thereof, and the extremity of said enlarged portion of the protuberance being spaced from said root by the area of said cut-out area defining said root to thereby locate and secure the magazine within the socket means.

2. The combination of claim 1 wherein said slot extends in a direction transverse to the direction of said path of travel of the strip of embossable material.

3. In a combination including
  a tool for embossing strip material wherein a strip of embossable material is advanced along a fixed path through the body of the tool and is selectively retracted along said path, said body including a top, bottom, opposite sides and first and second ends, embossing means intermediate said ends, feed means between said first end and said embossing means for advancing said strip along said path from said first end toward said second end and capable of selectively retracting said strip along said path from said second end toward said first end, and a socket in the body adjacent said first end, said socket including an opening; and
  a magazine containing a supply of said strip material coiled about an axis and received within said socket, the magazine including opposed side walls capable of being passed through said opening to seat the magazine in said socket;
  means for precluding inadvertent removal of the magazine from the socket as a result of the advancement and retraction of the strip material, said means comprising
  a slot in each side wall of the magazine, each slot having a profile lying in a plane generally perpendicular to the plane of the advancing strip of material, each said profile extending from an open mouth past a constriction and then past an enlarged seat and finally to a root defined by a cut-out area at the portion of the enlarged seat which is furthest from said mouth, said constriction being resiliently dilatable in a direction generally perpendicular to the axis of the coiled strip supply by virtue of the cut-out area forming the root and the spacing of the constriction from the root; and
  a pair of protuberances projecting into said socket generally perpendicular to the planes of the profiles, each protuberance extending into the socket from the body to an extremity and extending into one of said slots and including an enlarged portion complementary to the configuration of the seat of a corresponding profile and having a width greater than said constriction for being admitted through said mouth and said constriction into said seat by dilation of said constriction in said direction generally perpendicular to the axis of the coiled strip supply, said enlarged portions of said protuberances contacting said seats along the perimeters thereof, and the extremities of said enlarged portions of the protuberances being spaced from said roots by the area of each said cut-out area defining said roots to thereby locate and secure the magazine within the socket.

4. In a tool of the class wherein a strip of embossable material is advanced along a fixed path through the body of the tool from a magazine strip supply coiled about an axis and located in a socket in the body toward embossing means in the body and is selectively retracted back into the supply along the path, the magazine including means defining at least one slot extending from an open mouth past a constricting means and then past an enlarged seat and finally to a root defined by a cut-out area at the portion of said enlarged seat which is furthest from said mouth, said constricting means being resiliently dilatable in a direction generally perpendicular to the axis of the coiled strip supply by virtue of the cut-out area forming the root and the spacing of the constricting means from the root, the improvement comprising means defining at least one protuberance extending into the socket from the body to an extremity for extending into the slot and including an enlarged portion complementary to the configuration of said seat and having a width greater than said constricting means for being admitted through said mouth and said constricting means into said seat by dilation of said constricting means in said direction generally perpendicular to the axis of the coiled strip supply with said enlarged portion of said protuberance contacting said seat along the perimeter thereof and the extremity of said enlarged portion of the protuberance being spaced from said root by the area of said cut-out area defining said root to thereby locate and secure the magazine within the socket means.

5. In a tool of the class wherein a strip of embossable material is advanced along a fixed path through the body of the tool from a magazine containing a strip supply coiled about an axis and located in a socket in the body toward embossing means in the body and is capable of being selectively retracted along said path back into said supply, the body including a top, bottom, opposite sides and first and second ends, the socket including an opening in said top and the magazine including opposed side walls capable of being passed through said opening to seat the magazine in the socket and a slot in each side wall, each slot having a profile lying in a plane generally perpendicular to the plane of the advancing strip of material, each said profile extending from an open mouth adjacent said top past a constriction and then past an enlarged seat and finally to a root defined by a cut-out area at the portion of the enlarged seat which is furthest from said mouth, said constriction being resiliently dilatable in a direction generally perpendicular to the axis of the coiled strip supply by virtue of the cut-out area forming the root and the spacing of the constriction from the root, the improvement comprising a pair of protuberances extending into the socket generally perpendicular to the planes of the profiles and extending from the body to an extremity for extending into said slots, each protuberance including an enlarged portion complementary to the configuration of the seat of a corresponding profile and having a width greater than said constriction for being admitted through said mouth and said constriction into said seat by dilation of said constriction in said direction generally perpendicular to the axis of the coiled strip supply with said enlarged portions of said protuberances contacting said seats along the perimeter thereof and the extremities of said enlarged portions of the protuberances being spaced from said roots by the area of each said cut-out area defining said roots to thereby locate and secure the magazine within the socket.

6. In a magazine for containing the strip supply of embossable material in a combination including a tool for embossing strip material in which tool a strip of embossable material is advanced along a fixed path through the body of the tool from a strip supply coiled about an axis and located in the body toward embossing means in the body and is selectively retracted back into the supply, the magazine being capable of reception within socket means in the body, the combination further including means for precluding inadvertent removal of the magazine from the socket means as a result of the advancement and retraction of the strip material and means defining at least one protuberance extending into the socket means from the body to an extremity, said protuberance means having an enlarged portion of given width, the improvement comprising means defining at least one slot in the magazine extending from an open mouth past a constricting means defining a width less than said given width of the enlarged portion of the protuberance means and then past an enlarged seat complementary to the configuration of said enlarged portion of the protuberance means and finally to a root defined by a cut-out area at the portion of said enlarged seat which is furthest from said mouth, said constricting means being resiliently dilatable in a direction generally perpendicular to the axis of the coiled strip supply by virtue of the cut-out area forming the root and the spacing of the constricting means from the root to admit said enlarged portion into said seat and thereby locate and secure the magazine within the socket means.

7. In a magazine for containing the strip supply of embossable material in a combination including a tool for embossing strip material wherein a strip of embossable material is advanced along a fixed path from a strip supply coiled about an axis through the body of the tool and is selectively retracted along said path, the body including a top, bottom, opposite sides and first and second ends, embossing means intermediate said ends, feed means between said first end and said embossing means for advancing said strip along said path from said first end toward said second end and capable of selectively retracting said strip along said path from said second end toward said first end, and a socket in the body adjacent said first end, said socket including an opening, the magazine being capable of reception within said socket, the combination further including means for precluding inadvertent removal of the magazine from the socket means as a result of the advancement and retraction of the strip material and a pair of protuberances projecting into said socket, each protuberance extending from the body to an extremity and including an enlarged portion of given width, the improvement comprising opposed side walls in the magazine capable of being passed through said opening to seat the magazine in said socket, a slot in each said side wall, each slot having a profile lying in a plane generally perpendicular to the plane of the advancing strip of material, each said profile extending transverse to the direction of travel of said advancing strip from an open mouth past a constriction defining a width less than said given width of the corresponding enlarged portion of a corresponding protuberance and then past an enlarged seat complementary to the configuration of a corresponding enlarged portion of a corresponding protuberance and finally to a root defined by a cut-out area at the portion of said enlarged seat which is furthest from said mouth, said constriction being resiliently dilatable in a direction generally perpendicular to the axis of the coiled strip supply by virtue of the cut-out area forming the root and the spacing of the constriction from the root to admit each said enlarged portion into each corresponding seat and thereby locate and secure the magazine within the socket.

8. A magazine for containing a strip supply of embossable material coiled about an axis and capable of being received within a socket in the body of a tool for embossing such strip material, said tool having a pair of protuberances extending into the socket from the body to an extremity, each protuberance including an enlarged portion of given width, said magazine comprising:

a pair of parallel, spaced side walls;

top, bottom, front and rear walls interconnecting said side walls for defining a chamber in which said coiled strip supply may be contained with the axis thereof generally perpendicular to said side walls;

an aperture in said front wall providing an exit from said chamber for said strip material;

a slot in each said side wall for receiving one said protuberance, each slot including an open mouth at the intersection of each said side wall with the top wall and extending toward said bottom wall past a constricting means defining a width less than said given width of the enlarged portion of a corresponding protuberance and then past an enlarged seat complementary to the configuration of the enlarged portion of a corresponding protuberance and finally to a root defined by a cut-out area at the portion of said enlarged seat which is furthest from said mouth, said constriction being resiliently dilatable in a direction generally perpendicular to the axis of the coiled strip supply by virtue of the cut-out area forming the root and the spacing of the constricting means from the root to admit said enlarged portion of each protuberance into each corresponding seat and thereby locate and secure the magazine within the socket.

9. A magazine of claim 8 including an opening in said top wall communicating with each said slot in the side walls.

References Cited by the Examiner

UNITED STATES PATENTS

| | | | |
|---|---|---|---|
| 2,222,333 | 11/1940 | Wenzel et al. | 101—381 |
| 2,643,609 | 6/1953 | Gottscho | 101—377 |
| 2,940,389 | 6/1960 | Devon | 101—381 |
| 2,979,179 | 4/1961 | Anglim et al. | 197—6.7 |
| 3,083,807 | 4/1963 | Travoglio | 197—6.7 |
| 3,127,989 | 4/1964 | Travoglio | 197—6.7 |
| 3,129,800 | 4/1964 | Bogeaus | 197—6.7 |
| 3,129,813 | 4/1964 | Norvelle | 197—6.7 X |
| 3,209,682 | 10/1965 | Cooper et al. | 101—381 X |

ROBERT E. PULFREY, *Primary Examiner.*

E. S. BURR, *Assistant Examiner.*